I. K. SHERO.
HITCHING DEVICE.
APPLICATION FILED SEPT. 7, 1909.
986,768.
Patented Mar. 14, 1911.
2 SHEETS—SHEET 1.
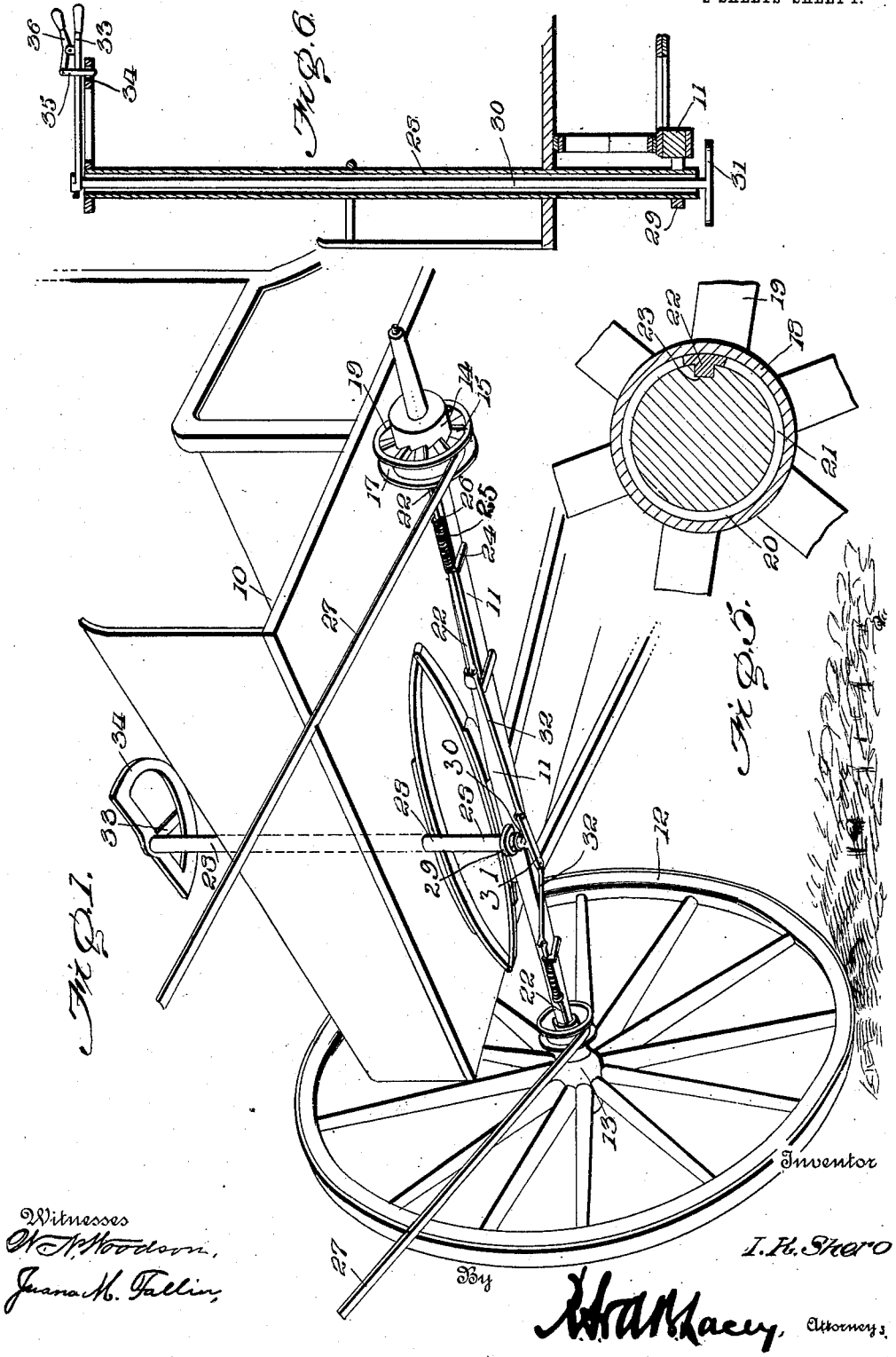

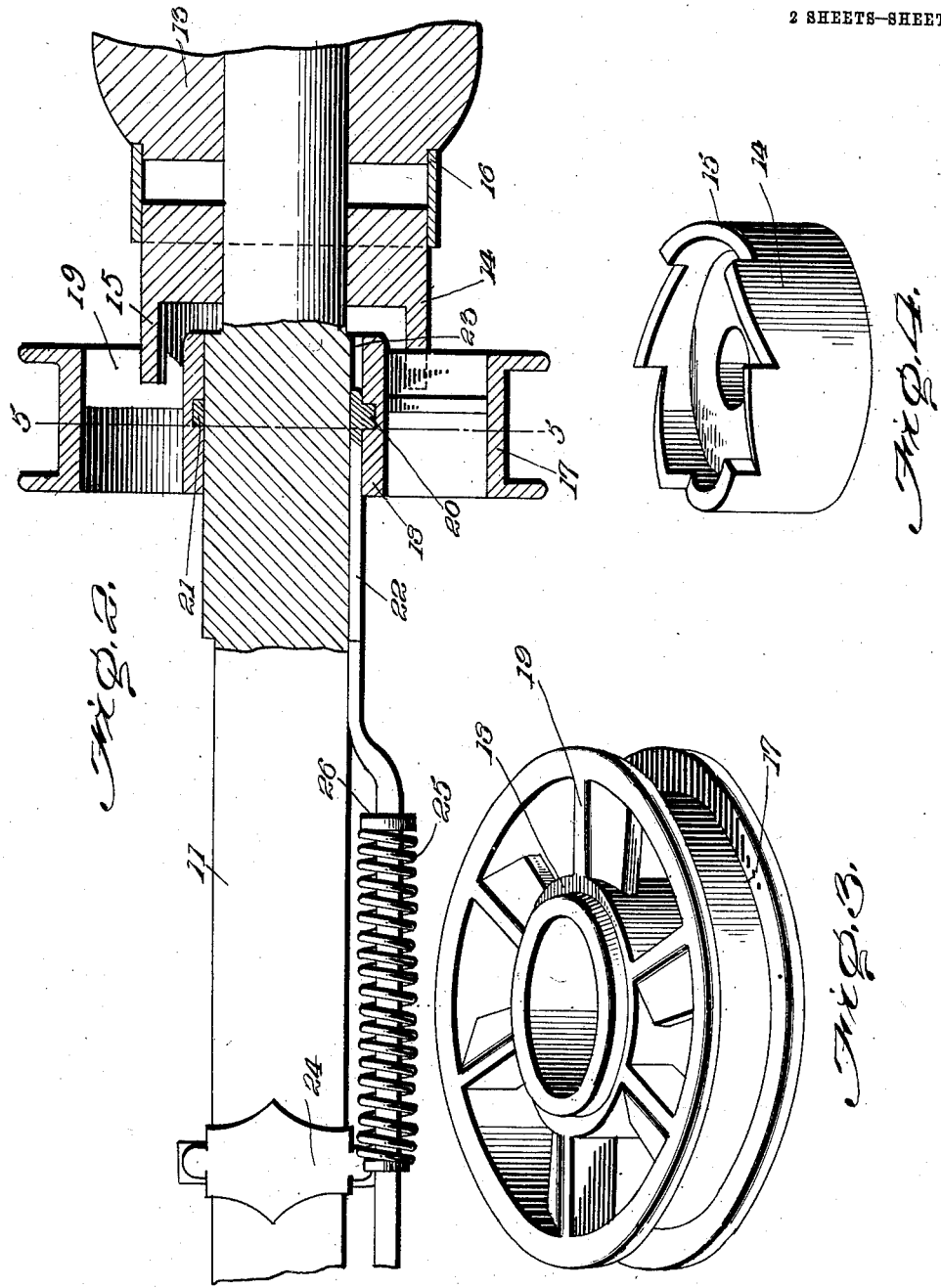

UNITED STATES PATENT OFFICE.

ISAAC K. SHERO, OF OKEMAH, OKLAHOMA.

HITCHING DEVICE.

986,768.   Specification of Letters Patent.   Patented Mar. 14, 1911.

Application filed September 7, 1909. Serial No. 516,325.

*To all whom it may concern:*

Be it known that I, ISAAC K. SHERO, citizen of the United States, residing at Okemah, in the county of Okfuskee and State of Oklahoma, have invented certain new and useful Improvements in Hitching Devices, of which the following is a specification.

This invention relates to hitching devices and refers particularly to a device of this character which is automatic in operation and has for its object a provision of means for checking a horse when the same starts when the driver is not in the vehicle, and for acting upon the horse in the same manner as though the operator was checking the animal.

Another object of this invention is the provision of a device of this character which is provided with a mechanism for tightening a check rein upon the animal, and which may be thrown into operation from a lever adjacent the seat in the vehicle.

A still further object of this invention is to connect a mechanism to the vehicle in such a manner that it may be meshed with the wheels of the vehicle in order to wind the check rein around a drum when the vehicle is drawn forwardly to thereby check the animal in its movement.

For a full understanding of the invention and the merits thereof and also to acquire a knowledge of the details of construction, reference is to be had to the following description and accompanying drawings, in which:

Figure 1 is a bottom perspective view of the forward end of a vehicle having the improved hitching device applied thereto; Fig. 2 is a detailed sectional view of one end of the front axle of the vehicle having the improved apparatus applied thereto; Fig. 3 is a detailed perspective view of one of the drums employed; Fig. 4 is a perspective view of one of the ratchets carried upon the wheel of the vehicle; Fig. 5 is a section on the line 5—5 of Fig. 2; and, Fig. 6 is a vertical section through the operating means for throwing the device into action.

Corresponding and like parts are referred to in the following description and indicated in all the views of the drawings by the same reference characters.

Referring to the drawings, the numeral 10 designates the body of the vehicle which is provided with a front axle 11 having disposed upon the opposite ends thereof the wheels 12. The inner end of each of the hubs 13 is provided with a ratchet 14 in the form of a disk having an inwardly and laterally extended flange 15 in which is formed the beveled faces constituting the teeth of the ratchet. The disk 14 engages frictionally within a collar or band 16 carried by the hub 13 and is thereby held in rotation with the wheel 12 upon the movement of the vehicle. Loosely disposed about the end of the axle 11 and inwardly of the ratchet 14 is a drum 17 which is mounted upon a loose sleeve 18 and is held upon the sleeve 18 by the provision of a plurality of radially formed spokes or arms 19. The spokes 19 are formed obliquely upon the sleeve 18 and toward the outer edge of the same for coöperation with the teeth of the ratchet 14 in order to secure the drum 17 rigidly to the ratchet 14 at times. Within the sleeve 18 is formed an annular groove 20 for the reception of a ring 21 which is loosely disposed about the axle 11 and adapted to retain the drum 17 in longitudinal adjustment on the axle 11. For the purpose of sliding the ring 21 longitudinally upon the axle 11, a bar 22 is employed which is of flattened formation and which is seated within a longitudinal recess 23 formed in the axle 11 to permit of the extension of the bar 22 into the sleeve 18 and in rigid engagement with the ring 21. The axle 11 is provided with a bracket 24 for supporting in loose engagement the bar 22 which is offset from the axle 11 and provided with a helical spring 25 disposed about and against the bracket 24. A collar 26 is rigidly engaged about the bar 22 at a predetermined distance from the end of the same in order to engage and to hold in compressed relation the spring 25. With this arrangement the bar 22 is normally held outwardly upon the axle 11 in order to force the drum 17 against the ratchet 14. A check rein 27 is engaged in the peripheral groove of the drum 17 and is wound thereabout upon the rotation of the hub 13, thus drawing the same backwardly and shortening the same.

The means for releasing the drum 17 from the ratchet 14 includes a tubular member 28 which is carried vertically upon the front axle 11 through the medium of a cleat 29 and through which is extended an operating rod 30 provided at its lower end with a T-head 31, the arms of which are normally extended in parallel with the axle 11 and connected through the medium of links 32 with the inner ends of the bars 22 carried upon the opposite ends of the axle 11. The upper extremity of the rod 30 is provided with a hand lever 33 which extends inwardly toward the seat of the operator and slides over a segment 34 rigidly mounted upon the upper end of the tubular member 28 and locked in adjusted position relative thereto through the medium of a pin 35 disposed upon a thumb lever 36 pivotally mounted adjacent the outer end of the hand lever 33. With this construction the tubular member 28 is rotated with the axle, and the operating rod 30 is carried therewith in order to retain the mechanism in inoperative relation to the wheels upon the turning of the vehicle about corners.

In operating the device when the driver desires to leave the vehicle, the thumb lever 36 is depressed to raise the pin 35 out of engagement with the segment 34, whereupon the springs 25 disposed about the bars 22 force the bars outwardly and rotate the T-head 31 and rod 30 to automatically engage the spokes 19 against the teeth formed upon the disk or ratchet 14. Should the animal move forwardly when the device is in such position the wheels 12 would rotate and carry the disk 14 therewith. As the spokes 19 are engaged with the teeth of the disk 14, the drum 17 would be simultaneously rotated and cause the shortening of the check rein 27 which would act in a manner to check the movement of the animal.

Having thus described the invention what is claimed as new is:

1. A rein tightener including an axle having a longitudinal recess in one side and adjacent to its outer end, a wheel carried upon the end of the axle and having inwardly extending teeth, a slidable bar arranged in the recess and having a ring upon its outer end engaging loosely about the axle, a sleeve slidably disposed upon the axle and adapted for free rotation thereabout and having an annular groove in its inner wall to receive the ring, said sleeve having a plurality of diagonal spokes registering with the teeth of the wheel, a drum upon the outer ends of the spokes for the reception of a check-rein, and means connected to the bar for actuating the same.

2. A rein tightener including an axle having a longitudinal recess adjacent to its outer end, a wheel carried upon the axle and having a ring upon its inner side, a disk carried within the ring and having inwardly extending teeth, a sliding bar disposed in the recess, a ring carried upon the end of the bar and engaging loosely about the axle, a sleeve slidably disposed about the axle and adapted for free rotation thereabout and having a groove in its inner wall to receive the ring, said sleeve having a plurality of transverse diagonal spokes registering with the teeth of the ring and a drum formed upon their outer ends for the reception of a check-rein, and operating means connected to the sliding bar.

In testimony whereof I affix my signature in presence of two witnesses.

ISAAC K. SHERO. [L. S.]

Witnesses:
JOHN G. POTTER,
LEWIS MOON.

---

Copies of this patent may be obtained for five cents each, by addressing the "Commissioner of Patents, Washington, D. C."